United States Patent [19]
Lorenz

[11] 3,825,345
[45] July 23, 1974

[54] METHOD OF AND APPARATUS FOR USE IN MEASURING THE PARTICLE SIZE DISTRIBUTION AND/OR THE CONCENTRATION OF PARTICLES IN SUSPENSION IN A GASEOUS DISPERSING MEDIUM

[75] Inventor: Gerhardt Lorenz, Gottingen, Germany

[73] Assignee: Sartorius-Membranfilter GmbH, Gottingen, Germany

[22] Filed: Mar. 19, 1973

[21] Appl. No.: 342,477

[30] Foreign Application Priority Data
Mar. 22, 1972 Germany............................ 2213859

[52] U.S. Cl..................... 356/85, 356/87, 356/102
[51] Int. Cl.......................... G01j 3/30, G01n 15/02
[58] Field of Search............ 356/85, 86, 87, 96, 97, 356/102; 250/218

[56] References Cited
UNITED STATES PATENTS

| | | | |
|---|---|---|---|
| 2,730,005 | 1/1956 | Vonnegut | 356/87 |
| 2,847,899 | 8/1958 | Walsh | 356/87 |
| 3,424,533 | 1/1969 | Hughes et al. | 356/87 |
| 3,644,743 | 2/1972 | Binek et al. | 356/87 |

OTHER PUBLICATIONS

Maximum Versatility A. A., F. E. Spectrometer; Jarrel Ash; February 68; pg. 2.

*Primary Examiner*—Vincent P. McGraw
*Attorney, Agent, or Firm*—Cushman, Darby and Cushman

[57] ABSTRACT

For measuring particle size distribution and/or particle concentration of particles in suspension in a gaseous dispersing medium, particles are admitted singly and in succession to an evaporation zone of an atomic absorption spectrometer in which absorption and emission pulses modulate a pulsating light beam which activates a photo-multiplier, the signals from the photomultiplier being fed to circuitry arranged to interpret the signals to provide an analysis of particle size distribution or concentration.

19 Claims, 5 Drawing Figures

METHOD OF AND APPARATUS FOR USE IN MEASURING THE PARTICLE SIZE DISTRIBUTION AND/OR THE CONCENTRATION OF PARTICLES IN SUSPENSION IN A GASEOUS DISPERSING MEDIUM

BACKGROUND OF THE INVENTION

The invention concerns a method of measuring the particle size distribution and/or the concentration of the articles in suspension in a gaseous dispersion medium, hereinafter called an aerosol, as well as apparatuses for performing the method.

Analyses of the size distribution of particles in natural suspension in an aerosol have in the past principally made use of two physical phenomena:
1. Diffusion of light by the particles and
2. Thermal emission by the particles.

The principle of analysis of particle size distribution by diffusion of light relies on a complex functional relationship that exists between particle size and the signal obtainable from the diffusion of transmitted light. Besides the particle size this relationship also contains the refractive index and the shape of the particles as further parameters. Moreover, the diffused light technique is hardly suitable for the determination of particle sizes below 0.3 $\mu$m because the signal-to-noise ratio becomes very unfavourable.

An attempt has already been made to overcome these difficulties by the employment of a luminescence particle counter, which involves the use of a flame photometric method of particle size analysis. In this method the aerosol particles are singly and consecutively taken to a minute hydrogen flame in which they evaporate. During their time of residence in the flame the particles emit a luminescent flash of an intensity which is proportional to their mass. The flashes are converted to electrical pulses in a photo-multiplier.

However, this thermal emission technique is unsuitable for particle size analyses of atmospheric aerosols. Furthermore, the sensitivity of the method is often too low by several orders of magnitude (i.e., powers of 10). The intensity of the emitted light flashes under conditions of thermal equilibrium (i.e., when the particles have been completely evaporated in the flame) is proportional to the ratio of the number of atoms that have been excited to the number of atoms still in the ground state. This ratio is relatively small even at temperatures of about 2,500°K. Whereas in the case of elements of lighter atomic weight, such as sodium and potassium it may assume values in the order of $10^{-4}$, it is in the order of $10^{-8}$ and $10^{-9}$ in the case of the heavier elements, such as copper or lead. In the case of elements of the latter kind the method is therefore completely insensitive.

On the other hand, the use of atomic absorption spectrometers is already known in the art, though only for chemical analytical purposes. In such an application the substances that are examined are present in very high concentrations.

One object of the invention is the provision of an extremely senisitive method of measuring the particle size distribution in aerosols.

It is another object of the invention to provide a method suitable for the detection of particles of 0.3 $\mu$m and less in size, and for the detection of individual particles of this order of magnitude.

It is another object of the invention to provide a method which is more particularly capable of detecting particles of the heaveier elements.

SUMMARY OF THE INVENTION

According to the invention these objects are achieved in a method of measuring the particle size distribution in aerosols based on the principle of atomic absorption, which comprises introducing the particles of the aerosol singly in succession into the evaporating zone of an atomic absorption sepctrometer, said zone being small enough to be completely filled by a single evaporated particle, and applying the output signal of a photo-multiplier of the atomic absorption spectrometer to a pulse rectifier which transmits the rectified signal to a multi-channel amplitude analyser associated with a counter in the output of each channel.

Contrary to the conventional emission technique the invention avails itself of the principle of atomic absorption, and unlike the emission technique the effectiveness of atomic absorption relies not upon the number of excited atoms but upon the number of atoms which are in their ground state, so that the proposed method is particularly suitable for the detection of heavier elements. Whereas for instance the resonance line of zinc is hardly detectable in an emission photometer, the absorption method is practically just as sensitive in this region as the emission method is for measuring sodium.

The aerosol particles are evaporated in an absorption zone. The expanse of the absorption zone forms an enclosure for the evaporated absorbing medium. The light source emits light by the excitation of atoms which are of the same kind as those that are to be examined, such as lead if it is intended to detect the presence of particles of lead in the atmosphere. The evaporated lead absorbs the light emitted by the lead atoms, the following photo-multiplier converting the light which has been transmitted through the absorption zone into an electrical signal which is applied to a measuring instrument for processing and indicating the same.

Another important requirement is that the absorption zone should be particularly small, namely sufficiently small to be completely filled with the vapour of a single small aerosol particle.

Subject to a minor modification of the instrumentation the proposed method can also be used for the determination of the particle concentration in aerosols. This can be done by introducing the particles single and in succession into the evaporating zone of an atomic absorption spectrometer, said zone being small enough to be completely filled by a single evaporated particle, and by applying the output signals of the photo-multiplier of the atomic absorption photometer to a pulse integrator.

Although the employment of an atomic absorption spectroscope for measuring the particle concentration in a silver iodide aerosol has already been described in the magazine Analytical Chemistry, vol. 41, No. 10, August 1969, on pages 1,172 to 1,175, the method there described would be suitable only for measuring much higher concentrations of aerosols than those the invention proposes to measure.

Aerosol particles which are introduced into an absorption zone formed for instance by a flame, will generally not merely absorb light but also emit light because their atoms are excited at the temperature existing in the flame. The light beam which has been transmitted through the absorption zone will then contain an impressed absorption signal which weakens the intensity of the beam as well as an impressed emission signal which adds to the intensity of the beam. Often it may then be difficult to observe any difference at all in the transmitted beam. This difficulty can be overcome if, according to the invention, a light source is used which emits at least part of the spectrum of the substance of the aerosol particles in the form of a light beam which before entering a photo-multiplier passes through a flame into which the aerosol particles are introduced for evaporation, the intensity of the beam changing at a frequency (carrier frequency) high enough for a plurality of intensity cycles to be propagated through the flame during the presence therein of one particle, in such manner that the frequency of the intensity change is modulated by an absorption pulse caused by the evaporated particle which simultaneously also generates an emission pulse, the light then entering the photo-multiplier for conversion into electrical oscillations and pulses, whereupon the carrier frequency which has been modulated by the absorption pulse is separated by filtration and rectified and the demodulated absorption pulse measured. Consequently only the absorption pulse is utilised for the measurement and the emission signal is desregarded.

In an even better modification the emission signal may also be utilised. According to the invention this can be done by the provision on the output side of the photo-multiplier or a separator of which one branch comprises a rectifier for rectifying the carrier frequency and demodulating the absorption pulse, whereas the other branch contains a low-pass filter which passes only the emission pulse, one of the two branches containing an inverter for inverting the polarity of the pulses from positive to negative and conversely and the outputs of both branches being jointly applied to a summation circuit, more particularly an additive mixer stage. The summation of the two signals provides an output of partcularly high power and therefore this method is twice as sensitive as that described in the preceding paragraph. For the detection of very small aerosol particles and of particles of light weight atoms this is an advantage.

The invention also relates to diverse modified forms of construction of instrumentation for performing the above-described methods.

One useful feature of such an instrument is that the evaporating zone is substantially completely transilluminated by the light beam. This improves the signal-to-noise ratio.

Moreover, the evaporation zone may be elongated in the direction of the light beam so that the degree of absorption that can be attained is improved.

Furthermore, the light beam may be transmitted repeatedly through the evaporation zone by a suitable disposition of mirrors. This also improves the absorption effect.

The evaporating zone itself may be constituted in diverse ways. For instance it may be defined by a flame, particularly a double microjet flame, a laser beam or the plasma of a plasma burner.

If the evaporation zone is a flame, then this will preferably be a flattened flame and the light beam transmitted horizontally through the flame in such a way that the path length inside the flame is a maximum. Alternatively a long upright flame of circular cross section might also be used and the light beam transmitted vertically through such a flame.

DESCRIPTION OF PREFERED EMBODIMENTS OF THE INVENTION

Figure 1:
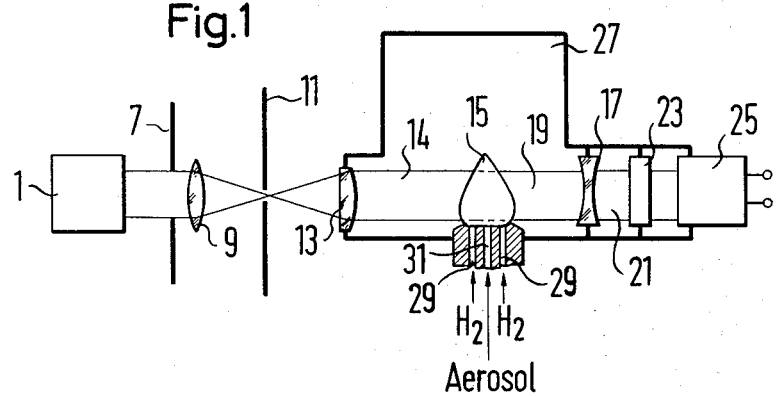
FIG. 1 is a schematic side view of the spatial disposition of the components of a prefered apparatus according to the invention.

Referring to FIG. 1 there is provided a concave cathode lamp. This is a gas discharge lamp having a concave dish-shaped cathode. This will be a copper dish if it is desired to examine the copper content of an aerosol. An anode, not shown in the drawing, emits an electron beam which excites the material of the concave cathode, forming a light spot thereon of say 7 mm diameter. An alternating voltage of a frequency to which reference will be made as the description proceeds is applied across the anode and cathode.

The concave cathode lamp faces a diaphragm 7 a relatively large aperture and this is followed by a condenser lens 9 which focuses an image of the light spot of the concave cathode on a relatively small opening in a stop 11. A lens 13 transforms the divergent beam which has passed through the stop 11 into a convergent beam and directs it through a flame 15. The lens 13 is cylindrically ground about a vertical axis in the plane of the paper or alternatively the lens may be associated with a cylinder lens. A beam having an oval cross section is thus obtained which is so orientated that its major axis is vertical. A diverging lens 17 which may be cylindrically ground about a horizontal axis, reconverts the convergent, astigmatic, beam 19 into a beam 21 of substantially parallel rays which pass through a monochromator 23. Several exchangeable monochromators may be provided for use with the different materials it is intended to analyse. The monochromatic light leaving the monochromator enters a photo-multiplier 25 which generates a corresponding electrical output signal.

The very small flame 15 burns in a chamber 27 in which a pump not shown in the drawing maintains a vacuum pressure of about 50 mm water column. For maintaining the flame hydrogen is introduced through two channels 29, whereas the aerosol is intoduced through a third channel 31 in the middle. The aerosol may be the environmental air which is drawn in. All three channels are contained in a common plane so that a flat flame is formed which has its major axis in the plane of the paper, i.e., in the plane containing the optical axis.

The fact that the longer side of the flame 15 extends in the direction of the optical axis provides the best possible compromise between two desiderata that are otherwise difficult to reconcile, namely:

1. The flame should be as small as possible. The shorter the residence time of the aerosol particles in the flame, which time in practice determines the "idle time" of the instrument, the greater is the maximum aerosol concentration the instrument can resolve. The lower limit of flame size is governed by the necessity to evaporate the particles inside the flame completely.

2. The distance traversed by the light beam through the flame should be as long as possible because absorption functionally depends upon this distance. On the other hand the flame must only be large enough to provide a locally fixed boundary for the evaporated particles.

Each aerosol particle evaporated in the flame constitutes a light absorbing medium whilst it resides in the flame, the length of the absorption path being determined by the width of the flame in the direction of the optical axis.

The cross sections of the light beam and of the flame are so matched that the beam transilluminates the major part of the flame.

By suitably diluting the aerosol it is possible to ensure that there is never more than one particle in the flame and that the next particle will not arrive until the first has already evaporated. The evaporating material absorbs a given part of the light of the beam. On the other hand it generally emits light of the same wavelength itself.

The flame could be replaced by a laser beam or by the plasma of a plasma burner. With regard to the size of the evaporation zones which are thus formed the same considerations apply as have been described with reference to the hydrogen flame.

Figure 4:
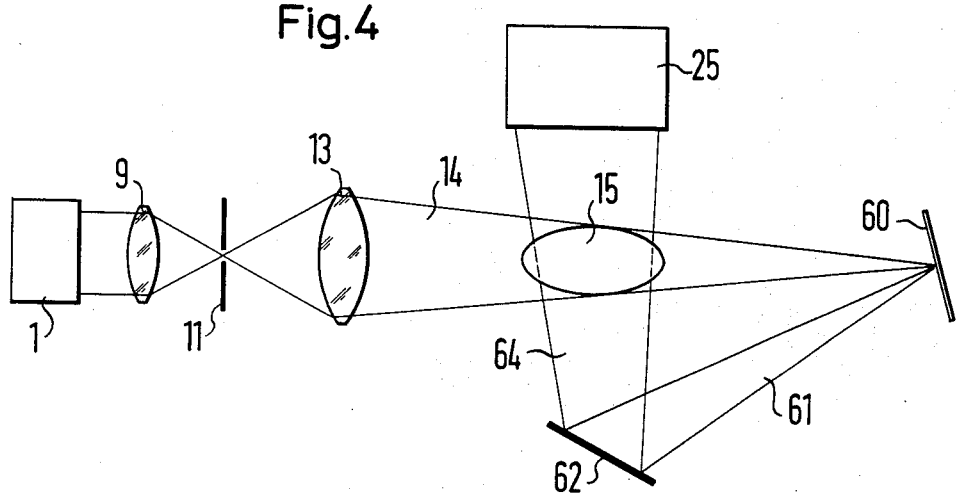
FIG. 4 is a schematic view from above of a further prefered embodiment of the invention.

In FIG. 4, which is a plan view of the apparatus shown therein, it will be readily seen that the flame 15 is elongated in the direction of the optic axis. The light beam 14 is narrowest in the plane of the paper and widest in a direction normal thereto. The beam first passes through the flame 15 in the direction of its horizontal longitudinal axis. It then impinges on a mirror 60 which reflects it in the form of a beam 61 towards a second mirror 62. The latter sends the beam, now 64, a second time through the flame 15. Not until having thus passed twice through the flame does the light enter the photo-multiplier 25.

Figure 5:
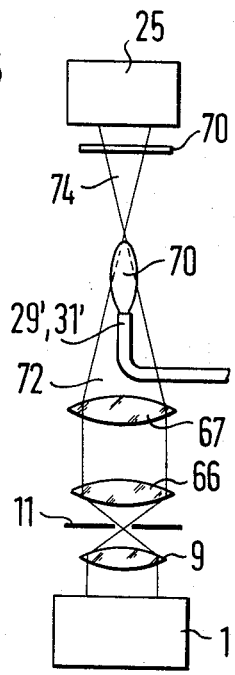
FIG. 5 is another prefered embodiment of the invention.

The arrangement in FIG. 5 has a vertical optical axis, as viewed, and is shown in side elevation. The beam of light issuing from the stop 11 first passes through two axially symmetrical lenses 66 and 67. Above the lens 67 are pipes 29', 31' which are bent upwards for the supply of a combustible gas and of the aerosol. A circularly symmetrical laminar micro-flame 70 is thus formed through which the lens 67 upwardly transmits a light beam 72 in such manner that the beam illuminates the greatest possible part of the flame and converges to a focus at the tip of the flame. The beam 74 energing from the flame is projected into the photo-multiplier 25 after having first passed through a heat retaining filter 76.

Figure 2:
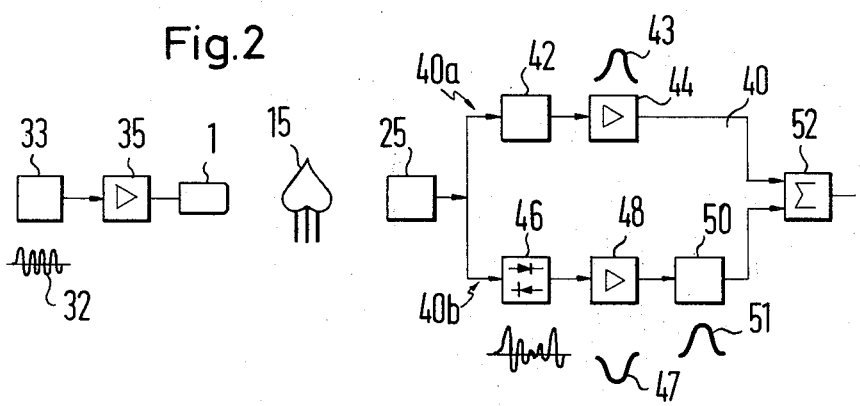
FIG. 2 is a block diagram of the associated circuitry, showing the wave and pulse shapes in the several stages.

With reference to the circuit diagram in FIG. 2 the alternating current required for operating the concave cathode lamp is supplied by an oscillator 33. The oscillator frequency 32 is so chosen that it will generate say 10 cycles during the residence time of one aerosol particle in the flame 15. In order of magnitude this frequency may be 1 kc/s. The output signal of the oscillator is amplified in an amplifier 35 and then applied to the concave cathode lamp 1. If the frequency is too high for the concave cathode lamp to function satisfactorily then the lamp may be operated with d.c. and the stationary stop 11 replaced by a rotating chopper disc which has an annulus of holes around its periphery for chopping a continuous light beam into a sequence of pulses.

The output of the photo-multiplier 25 contains a signal which represents an emission pulse and another signal which represents the oscillator frequency modulated by an absorption pulse. The two signals are separated in a dividing filter circuit, one branch 40a of which includes a low-pass filter 42 which allows only the emission pulse 43 to pass through to an amplifier 44, and the other branch 40b of which includes a full-wave rectifier 46. This rectifier 46 is phase-responsive and blocks the emission pulses. However, it rectifies the carrier frequency and extracts the original modulating absorption pulse 47 which is amplified in an amplifier 48. The amplifier output is inverted, i.e., with respect to positive and negative, in an inverter 50. The output signals 43 and 51 of both branches 40a and 40b are then jointly taken to an additive mixing stage 52 where they are summated. The output signal of this stage is applied in conventional manner to suitable indicating instruments.

The pulse amplitude of this signal is a measure indicating the particle size, and its repetition frequency is a measure of particle concentration.

If it is desired to ascertain the particle size distribution in the aerosol the output signal of the stage 52 will be applied to an amplitude analyser which has several outputs for different amplitude ranges and hence particle size ranges. Each output is associated with a counter. By evaluating the several counts the particle size distribution can be ascertained.

On the other hand, if it is desired to determine the particle concentration in the aerosol the output signal of the stage 52 is applied to a pulse integrator associated with an analog instrument. This gives a reading for the total number of particles per cubic meter of air. If the average specific gravity is a known quantity the total weight in mg/cub.m can be readily calculated. Furthermore, if the size distribution of the particles has already been ascertained, the number of particles per cub.meter can be inferred.

The following explanations serve to derive a formula which is essential to the evaluation of the measured results.

When a monochromatic beam of light of intensity $I_0$ is transmitted through a light-absorbing medium of thickness $l$ it is attenuated. The intensity $I$ of the attenuated beam is related to the intensity $I_0$ of the incident beam by the formula $$I/I_0 = e^{-ml}$$

Figure 3:
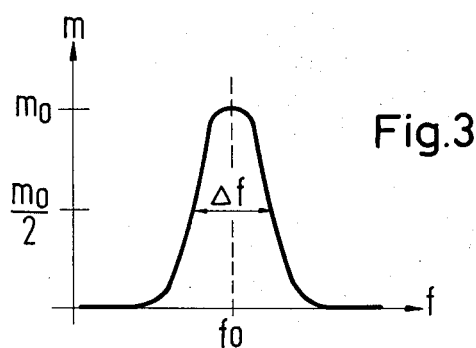
FIG. 3 is a representation of an absorption curve.

1.

where $m$ is the absorption coefficient of the medium at the given frequency $f$. In an $m$-$f$ plot the absorption coefficient $m$ is not a thin line but a distribution curve having a width at half its peak value of $\Delta f$ (FIG. 3). The integral taken over the absorption curve is proportional to the number of atoms of the absorbing medium in their ground state $$\int m_f df = K \cdot N$$

2.

In this equation $N$ is the number of atoms in their ground state and is a constant. The peak value $m_o$ of an absorption line is $$m_o = (2b/\Delta f) \int m_f df \qquad 3.$$

where $b$ is a constant and $\Delta f$ is the half peak width of the line. It follows from (2) and (3) that $$m_o = (2b/\Delta f) \, K \cdot N \qquad 4.$$

Combining equations (1) and (4) gives $$\log_e I/I_o = -a \cdot N \qquad 5.$$

where $a$ is a factor of proportionality depending only upon the absorption medium and the wave length of the light that is to be absorbed.

If now aerosol particles of a particular composition are fed to a hydrogen micro-flame individually, and assuming that the particles evaporate completely, then the flame can be regarded as being an absorption medium of constant thickness for as long as the particles are retained in the flame. Absorption is then proportional to the number of atoms of the particle in the ground state and, as has been explained above, this will be nearly all the atoms in the particle. Hence, for spherical particles $$N \sim \rho \times L/w \, \pi/6 \, d^3 \qquad 6.$$

where $\rho$ is the density of the particles, $w$ is the atomic or molecular weight, $L$ is Loschmidt's number and $d$ is the diameter of the particles. Combining equations (5) and (6) we can write $$\log_e I_o - \log_e I = c \cdot d^3 \qquad 7.$$

where again $c$ is a constant. The absorption pulse height $\Delta \log_e I = \log_e I$ as a function of particle size $d$ plotted in a double logarithmic graph therefore appears as a straight line having a slope of 3 : 1.

Equation (7) is valid provided the central frequency of the monochromatic beam of light agrees with the central frequency of the absorption curve. This condition is satisfied when the emission spectrum of the substance that is to be analysed is used as a light source. Consequently concave cathode lamps are suitable for the contemplated purpose. The half peak widths of the emission lines are substantially smaller than the corresponding absorption line widths. This leads to high sensitivity of the described method of measuring.

I claim:

1. Apparatus for analyzing particles in an aerosol, comprising an atomic absorption means for measuring the size of single particles of said aerosol, the absorption means having an enclosure defining an evaporating zone which is small enough to be completely filled by a single evaporated particle; means for introducing particles in suspension singly and in succession into the evaporating zone; a light source for transmitting a light beam through the evaporating zone of the atomic absorption means, such that the evaporating zone is almost completely transilluminated by the light beam, the light beam including at least part of the spectrum of the particles introduced to the evaporating zone; means for changing the intensity of the light beam periodically at a carrier frequency such that a plurality of cycles of change of intensity of the light beam take place during the presence of a particle in the evaporating zone, whereby the carrier frequency is modulated, in use of the apparatus, by an absorption pulse produced due to the evaporation of a particle in the evaporating zone, and by an emission pulse produced simultaneously by said evaporation; photo-multiplier means arranged to receive light with modulated carrier frequency transmitted from the evaporating zone in the operation of the apparatus, and to provide an electrical output in response to light received from the evaporating zone; rectifier means to which said electrical output can be applied for rectifying the electrical output and means for measuring the demodulated absorption pulse.

2. Apparatus according to claim 1 including a monochromator situated in the path of the light beam between the evaporating zone and the photo-multiplier.

3. Apparatus according to claim 1 including multi-channel amplitude analyzer means for analyzing the amplitude of the rectified electrical output; and counter means associated with each channel of said multi-channel amplitude analyzer mans for counting the number of signals received by each respective channel and thus measuring the size distribution of the particles.

4. Apparatus according to claim 1 including integrating means for integrating the rectified electrical outputs corresponding to the presence of a plurality of particles in the evaporating zone for obtaining a measure of the concentration of particles in suspension in a unit volume of the gaseous dispersing medium.

5. Apparatus according to claim 1 and further comprising an A.C. power source for operating said light source at said carrier frequency.

6. Apparatus according to claim 1 wherein the light source is powered by a d.c. power source and means is provided for chopping the light beam at a frequency equal to said carrier frequency.

7. Apparatus according to claim 1 wherein the evaporating zone is provided by a laminar flame.

8. Apparatus according to claim 7 wherein the evaporating zone is provided by a twin micro-jet flame.

9. Apparatus according to claim 1 wherein the evaporating zone is provided by a laminar micro-flame and the light source is arranged to project the light beam along a vertical path in passing through the flame.

10. Apparatus according to claim 1 wherein the light source is positioned such that the light beam is passed through the flame from beneath and means is provided for focussing the light beam at the tip of the flame.

11. Apparatus according to claim 1 wherein the evaporating zone is provided by a laser beam.

12. Apparatus according to claim 1 wherein the evaporating zone is provided by the plasma of a plasma burner.

13. Apparatus according to claim 1 and further comprising filter mean comprising a first branch including said rectifier means, and a second branch comprising low-pass filter means for passing only the emission pulse; one of the first and second branches further comprising inverter means for inverting the polarity of pulses transmitted therealong; and a mixer circuit to which outputs from both of said first and second branches can be applied for mixing before applying the resultant signal to the measuring means.

14. Apparatus according to claim 1 wherein reflecting means is provided for passing the light beam at least twice through the evaporating zone.

15. Apparatus according to claim 1 wherein the evaporating zone is elongate in the direction of the path of the light beam.

16. A method for analyzing particles in an aerosol, the method comprising the steps of introducing the particles in suspension singly and in succession into an evaporating zone, said zone being small enough to be completely filled by a single evaporated particle; transmitting a light beam from a light source through the evaporating zone such that the evaporating zone is almost completely transilluminated by the light beam, the light beam including at least part of the spectrum of the particles introduced to the evaporating zone; changing the intensity of the light beam periodically at a carrier frequency such that a plurality of cycles of change of intensity of the light beam take place during the presence of a particle in the evaporating zone, modulating the carrier frequency by an absorption pulse produced due to evaporation of a particle in the evaporating zone, which particle simultaneously generates an emission pulse, the light beam being transmitted with modulated carrier frequency to a photo-multiplier to provide a corresponding electrical output; separating the signal component corresponding to the carrier frequency from said electrical output; rectifying said signal component; and measuring the demodulated absorption pulse.

17. A method according to claim 16 wherein the light source changes its intensity in accordance with an alternating current applied thereto and operated at said carrier frequency.

18. A method according to claim 16 wherein the light beam is chopped by rotating a member at a repetition frequency corresponding to the carrier frequency.

19. A method according to claim 16 wherein the light beam is passed at least twice through the evaporating zone.

* * * * *